(12) United States Patent
Brou et al.

(10) Patent No.: US 10,503,378 B2
(45) Date of Patent: *Dec. 10, 2019

(54) METHODS AND APPARATUS FOR USER-CUSTOMIZABLE APPLICATION SOFTWARE

(71) Applicant: Ascent Technology, Inc., Cambridge, MA (US)

(72) Inventors: Philippe Brou, Boston, MA (US); Allan C. Wechsler, Belmont, MA (US)

(73) Assignee: Ascent Technology, Inc., Boston, MA (US)

( * ) Notice: Subject to any disclaimer, the term of this patent is extended or adjusted under 35 U.S.C. 154(b) by 409 days.

This patent is subject to a terminal disclaimer.

(21) Appl. No.: 14/923,396

(22) Filed: Oct. 26, 2015

(65) Prior Publication Data
US 2016/0162170 A1 Jun. 9, 2016

Related U.S. Application Data

(63) Continuation of application No. 13/888,611, filed on May 7, 2013, now Pat. No. 9,170,703.

(Continued)

(51) Int. Cl.
*G06F 3/0484* (2013.01)
*G06F 3/048* (2013.01)
(Continued)

(52) U.S. Cl.
CPC .......... *G06F 3/04847* (2013.01); *G06F 3/048* (2013.01); *G06F 3/0482* (2013.01);
(Continued)

(58) Field of Classification Search
CPC .... G06F 3/04847; G06F 3/048; G06F 9/4443; G06Q 10/06316
See application file for complete search history.

(56) References Cited

U.S. PATENT DOCUMENTS 7,509,398 B2   3/2009  Acharya et al.
7,676,560 B2   3/2010  McCollum
(Continued)

OTHER PUBLICATIONS

"Methodology for Analysis, Modeling and Simulation of Airport Gate-waiting Delays", Wang et al., George Mason University, Jan. 12, 2011 (Year: 2011).*

*Primary Examiner* — Li P Sun
(74) *Attorney, Agent, or Firm* — Kaplan IP Law, PLLC; Jonathan T. Kaplan

(57) ABSTRACT

An application's users are divided into two groups: administrative users and end-users. Each type of region, produced on an application's screen, is assigned a class. Each actual occurrence, of a region type, is called an instance. An end-user invokes a user-added feature by indicating a screen location and inputting a unique signal. The classes, of the screen-region instances present at the indicated location, determine whether one or more rules are activated. The rules are written by an administrative user. If activated, a rule produces a URL in accordance with an administrative-user-defined template. A value stored in the instances present, at the location indicated when the unique signal occurred, are accessed in a template by including the name of the value as a parameter. Each parameter is substituted by the text-equivalent of its current value. The URL produced can be used to provide the information desired by the end-user.

13 Claims, 14 Drawing Sheets

Related U.S. Application Data

(60) Provisional application No. 61/676,119, filed on Jul. 26, 2012.

(51) Int. Cl.
- *G06F 3/0482* (2013.01)
- *G06Q 10/02* (2012.01)
- *G06Q 10/06* (2012.01)
- *G06Q 50/30* (2012.01)
- *G06F 17/22* (2006.01)
- *G06F 17/24* (2006.01)

(52) U.S. Cl.
CPC ........ *G06F 17/2235* (2013.01); *G06F 17/248* (2013.01); *G06Q 10/02* (2013.01); *G06Q 10/06314* (2013.01); *G06Q 10/06316* (2013.01); *G06Q 50/30* (2013.01)

(56) References Cited

U.S. PATENT DOCUMENTS

| | | |
|---|---|---|
| 7,770,102 B1 * | 8/2010 | Wolff .................... G06Q 30/02 715/234 |
| 7,992,127 B2 | 8/2011 | Loupia et al. |
| 2002/0109725 A1 | 8/2002 | Suzuki et al. |
| 2003/0208472 A1 | 11/2003 | Pham |
| 2005/0246664 A1 | 11/2005 | Michelman et al. |
| 2006/0041623 A1 | 2/2006 | Danninger |
| 2006/0265344 A1 | 11/2006 | Woods |
| 2007/0226201 A1 * | 9/2007 | Lerum ................ G06F 11/0775 |
| 2007/0271247 A1 * | 11/2007 | Best .................. G06F 17/30867 |
| 2008/0209356 A1 | 8/2008 | Grechanik et al. |
| 2008/0270428 A1 * | 10/2008 | McNamara ....... G06F 17/30876 |
| 2009/0106257 A1 | 4/2009 | Iskold et al. |
| 2009/0138561 A1 | 5/2009 | Bahrs et al. |

* cited by examiner

WHOLE_CHART class

GATE_ROW class

FLIGHT_LEG class

NOW_LINE class

Figure 3A

```
1   /* A type of data object that can hold all the information needed to execute an applicable user-created feature. */
2   token is structure of {
3       HandledTypes; /* For each instance indicated, by an end-user's latest UPL, its class is indicated in this list. */
4       /* For each instance indicated by user's latest UPL, the following list includes a function that, given a parameter name, can retrieve the
5          instance's value for it. */
6       ParameterResolvers;
7   }
8
9   /* Called only if the UPL Processor tests positive for a gesture accompanying user's input of a UPL. UserPointed is defined to contain all the data
10     that can be available, as a result of such a UPL and gesture input. */
11  GestureProcessor (UserPointed) {
12      /* Assemble, into such token, the information needed to execute the applicable user-created feature. */
13      Info4UserCommands = CollectAccess4Instances(UserPointed);
14      /* Rules triggered, by UserPointed, can be determined from the following information of Info4UserCommands: names of the classes of screen-
15         regions indicated. */
16      MatchingRules = FindMatchingRules(Info4UserCommands);
17      /* If 1 rule is triggered, it is executed by calling InvokeRule. */
18      if (Length(MatchingRules) == 1) InvokeRule(MatchingRules[0], Info4UserCommands);
19      /* If >1 rules are triggered, disambiguating pop-up menu can be presented to user. */
20      else if (Length(MatchingRules) > 1) DisambiguatingPopupMenu(MatchingRules, Info4UserCommands);
21      /* If 0 rules triggered, nothing is executed. */
22  } /* end "GestureProcessor" */
```

Figure 3B

1  /* Assembles, in a data object of type "token," all the information needed to execute the applicable user-created feature. */
2  CollectAccess4Instances(UserPointed) {
3  /* Creates an instance, of type "token," to contain the information collected. */
4  Info4UserCommands = NewToken();
5  /* Following "for" loop iterates over each instance pointed to. An end-user indicates a point on an App's display screen though a use of a pointing
6  method that includes a gesture. Assembles, for each of user's pointed-to instances:
7  • The name of the class of screen-region to which each instance belongs.
8  • The access method (or "resolver") by which to access the data of each type of instance. Each instance is an instantiation of a
9  class of screen-region. */
10 FOR EACH DisplayedInstance INDICATED BY UserPointed {
11     /* Create list of the class names represented by the instances and add to the applicable token. */
12     add ClassOf(DisplayedInstance) to HandledTypes(Info4UserCommands);
13     /* ParameterResolver fetches, for a given DisplayedInstance, its resolver and adds such resolver to the applicable token. A resolver can
14     fetch the value of each named parameter, defined for the class of which DisplayedInstance is an instance. */
15     ADD ParameterResolver(DisplayedInstance) TO ParameterResolvers(Info4UserCommands);
16 } /* End "FOR" loop */
17 RETURN Info4UserCommands;
18 } /* End procedure "CollectAccess4Instances" */

Figure 3C

```
1   /* A type of data object that can hold all the information needed to execute an applicable user-created feature. */
2   Rule is structure of {
3       RequiredTypes;
4       URLTemplate;
5       DisplayTemplate;
6   }
7
8   FindMatchingRules(Token) {
9   /* For case where 0 rules match, initialize returned result to null. */
10      Result = null;
11  /* RuleSet can be loaded from persistent storage (e.g., a file or a database). RuleSet is a list of "Rule" structures, as defined above. */
12      FOR EACH "Rule" IN RuleSet {
13          IF (RuleMatchesToken(Rule, Token)) {
14              ADD Rule TO Result;
15          } /* end IF */
16      } /* end "FOR" loop */
17      RETURN Result;
18  } /* End "FindMatchingRules" */
19
20  /* Checks whether the RequiredTypes of a rule are satisfied by token's HandledTypes. If yes, TRUE is returned. */
21  RuleMatchesToken(Rule, Token) {
22      RETURN ( RequiredTypes(Rule) SUBSET OF HandledTypes(Token) );
23  }
```

Figure 3D

```
1   /* Executes the action template of a rule. of the Rules Database, using the information in Token. */
2   InvokeRule(Rule, Token) {
3     /* Steps, from inside out:
4        • URLTemplate: The template for "Rule," written by a user to implement a user-specified feature, is fetched.
5        • ResolveTemplate: Template is converted into a literal URL (aka "resolved").
6        • DisplayWebBrowser: Takes complete URL and directs a web browser to navigate to the indicated page. */
7     DisplayWebBrowser( ResolveTemplate( URLTemplate(Rule),Token) );
8   } /* end "InvokeRule" */
9
10  ResolveTemplate(Template, Token) {
11    Result = ""; /* Literal URL, to be returned to caller, begins as string with 0 characters. */
12    /* ParseTemplate breaks its argument into "segments," each of which is either a fragment of literal text or it represents a named parameter. Each
13    parameter is substituted with the text equivalent of its value in a relevant instance. Regarding distinguishing parameters from literal text, any
14    unambiguous syntax can be used. */
15    FOR EACH Segment IN ParseTemplate(Template) {
16      IF (IsLiteral(Segment)) {
17        Result = Result || Segment; /* where the concatenation operator is || */
18      } /* end IF */
19      ELSE IF (IsParameter(Segment)) {
20        Result = Result || ResolveParameter(Segment, Token);
21      } /* end ELSE IF */
22    } /* end "FOR" loop */
23    RETURN Result;
24  } /* end "ResolveTemplate" */
```

Figure 3E

```
1   /* Given a parameter name, and a Token, does the following:
2      •  Searches through all the instances indicated, by the user's latest pointing to App1's screen, looking for the value of the indicated
3         parameter.
4      •  Returns the text equivalent of the parameter's value. */
5   ResolveParameter(Parameter, Token) {
6   FOR EACH ParameterResolver IN ParameterResolvers(Token) {
7      /* LookupParameter searches, using the particular resolver currently assigned to ParameterResolver (2nd argument), for the value
8         assigned to a parameter with the name indicated by "Parameter" (1st argument). If a value for the parameter is found, the expression of
9         such value as a string (i.e., its string equivalent) is returned. */
10     Value = LookupParameter(Parameter, ParameterResolver);
11     IF (NotNull(Value)) {
12        RETURN Value;
13     } /* end IF */
14  } /* end "FOR" loop */
15  } /* end "ResolveParameter" */
```

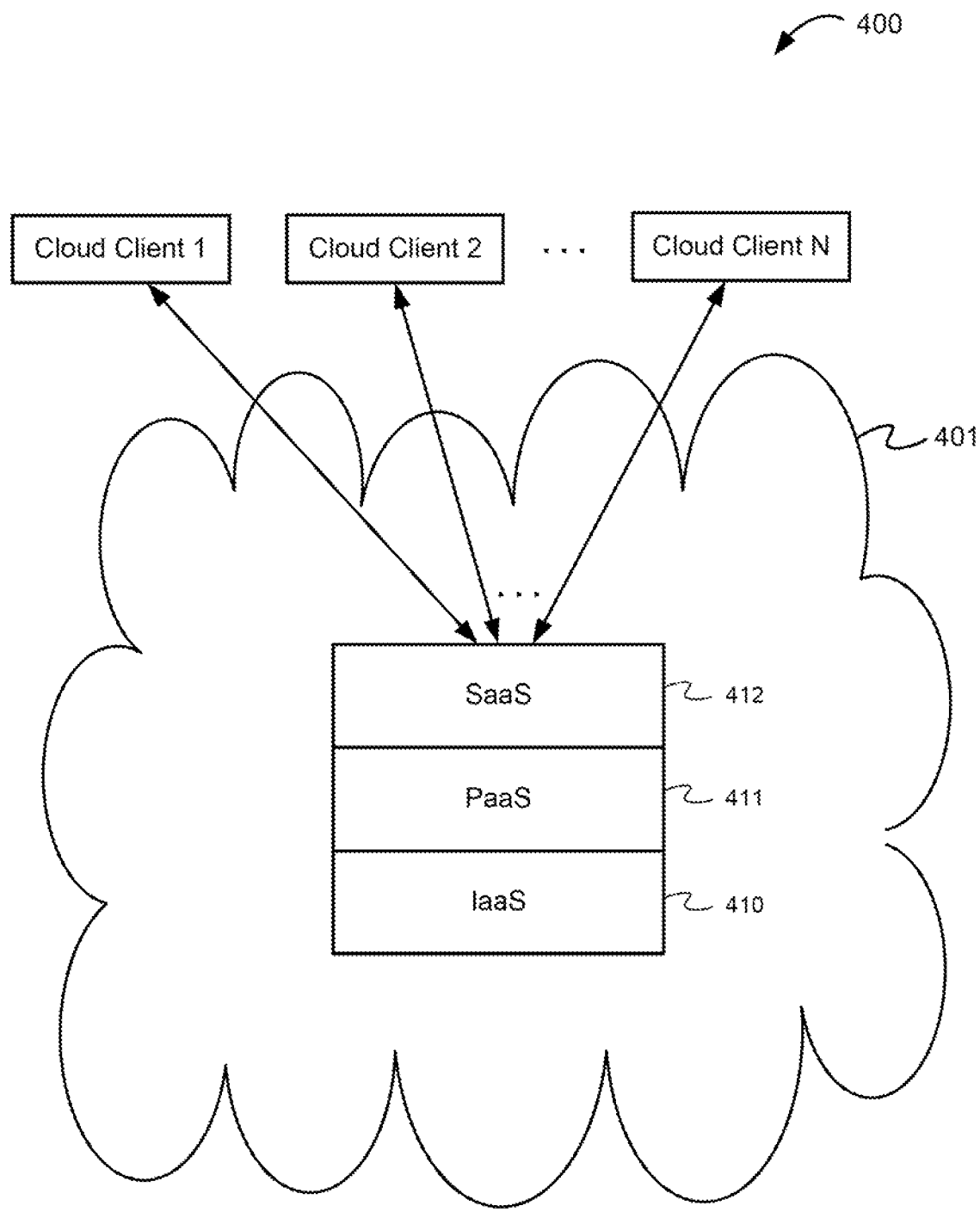

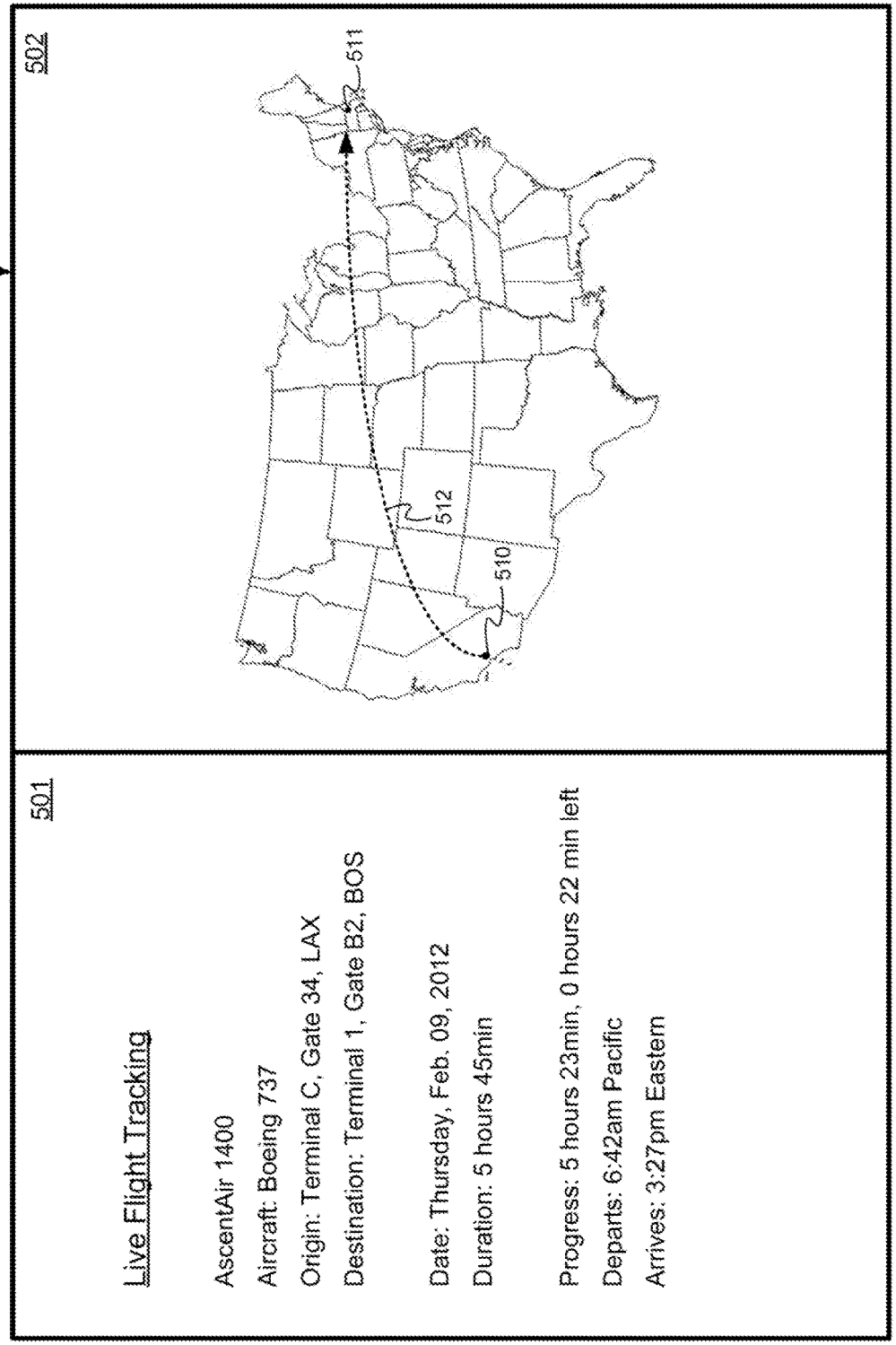

METHODS AND APPARATUS FOR USER-CUSTOMIZABLE APPLICATION SOFTWARE

As provided for under 35 U.S.C. § 120, this patent claims benefit of the filing date of the following U.S. patent application, herein incorporated by reference in its entirety:

"Methods and Apparatus for User-Customizable Application Software," filed 2013 May 7 (y/m/d), having inventors Philippe Brou and Allan C. Wechsler, and application Ser. No. 13/888,611.

As provided for under 35 U.S.C. § 119(e), application Ser. No. 13/888,611 claimed benefit of the filing date, and accomplished an incorporation by reference in its entirety, for the following U.S. Provisional Application:

"Methods and Apparatus for User-Customizable Application Software," Application No. 61/676,119, filed 2012 Jul. 26 (y/m/d).

Application No. 61/676,119, filed 2012 Jul. 26 (y/m/d), is herein incorporated by reference in its entirety.

FIELD OF THE INVENTION

The present invention relates generally to the user-customization of application software, and more particularly to customization that includes customizable production of a Universal Resource Identifier (or URI).

BACKGROUND OF THE INVENTION

Communication between application software and a resource, by the production of a Uniform Resource Locator (or URL), is known. (In the singular, application software can be referred to, with increasing levels of brevity, as an: "application program," "application," or "App".) For example, an App for reading emails (such as OUTLOOK from MICROSOFT CORPORATION, Redmond, Wash.) can detect the presence of a URL (or "link"), in an email message, and "activate" that link. Once activated, a user can "go to" the URL (i.e., open the page, at the URL, in a web browser), embedded in an email, simply by selecting the link (e.g., "clicking" the URL with a mouse).

A limitation of this type of activation is that it is "static" (i.e., the particular URL, embedded in an email, is fixed).

A REST (or a REpresentational State Transfer) approach to web services can allow customizable App-to-App communication via URIs. Web services, however, merely provide a more uniform basis for interchange between Apps (typically, business-oriented Apps). The behavior of the App itself is still determined by the coding of the App producer (e.g., MICROSOFT CORPORATION) and is thus "fixed," from the perspective of an end-user.

It would be desirable to introduce techniques and methods by which to enable user-customization that includes user-customizable production of URLs and, more generally, Uniform Resource Identifiers (URIs). (Uniform Resource Identifier is a term that covers both URLs and Uniform Resource Names). Such capability would provide a greater range of options by which each user can adapt an App's behavior to the user's particular operating environment and needs.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 3A shows pseudo-code for the main procedure of the Gesture Processor (called "GestureProcessor").

FIG. 3B depicts pseudo-code for CollectAccess4Instances.

FIG. 3C illustrates pseudo-code, for FindMatchingRules (second major stage of GestureProcessor), and RuleMatchesToken.

FIG. 3D shows pseudo-code, for InvokeRule (third major stage of GestureProcessor), and ResolveTemplate.

FIG. 3E presents pseudo-code for ResolveParameter.

FIG. 4A depicts an example "cloud" computing environment 400 in which the techniques described herein can be applied.

FIG. 5 shows an example screen 500, that can be produced in response to a URL.

DETAILED DESCRIPTION OF PREFERRED EMBODIMENTS

Reference will now be made in detail to various embodiments of the invention, examples of which are illustrated in the accompanying drawings. Wherever possible, the same reference numbers will be used throughout the drawings to refer to the same or like parts.

Please refer to Section 5 ("Glossary of Selected Terms"), included as the last section of the Detailed Description, for the definition of selected terms used below.

Table of Contents to Detailed Description

1 Use-Case Scenario
  1.1 Gate Assignment Software
  1.2 Additional Features Desired
2 First Embodiment
3 Implementation Strategies
4 Computing Environment
5 Glossary of Selected Terms

1 Use-Case Scenario

1.1 Gate Assignment Software

Large metropolitan area airports (e.g., Logan International Airport, Boston, Mass., U.S.A; IATA code "BOS") frequently use some kind of App for assigning airplanes to gates.

Figure 1:
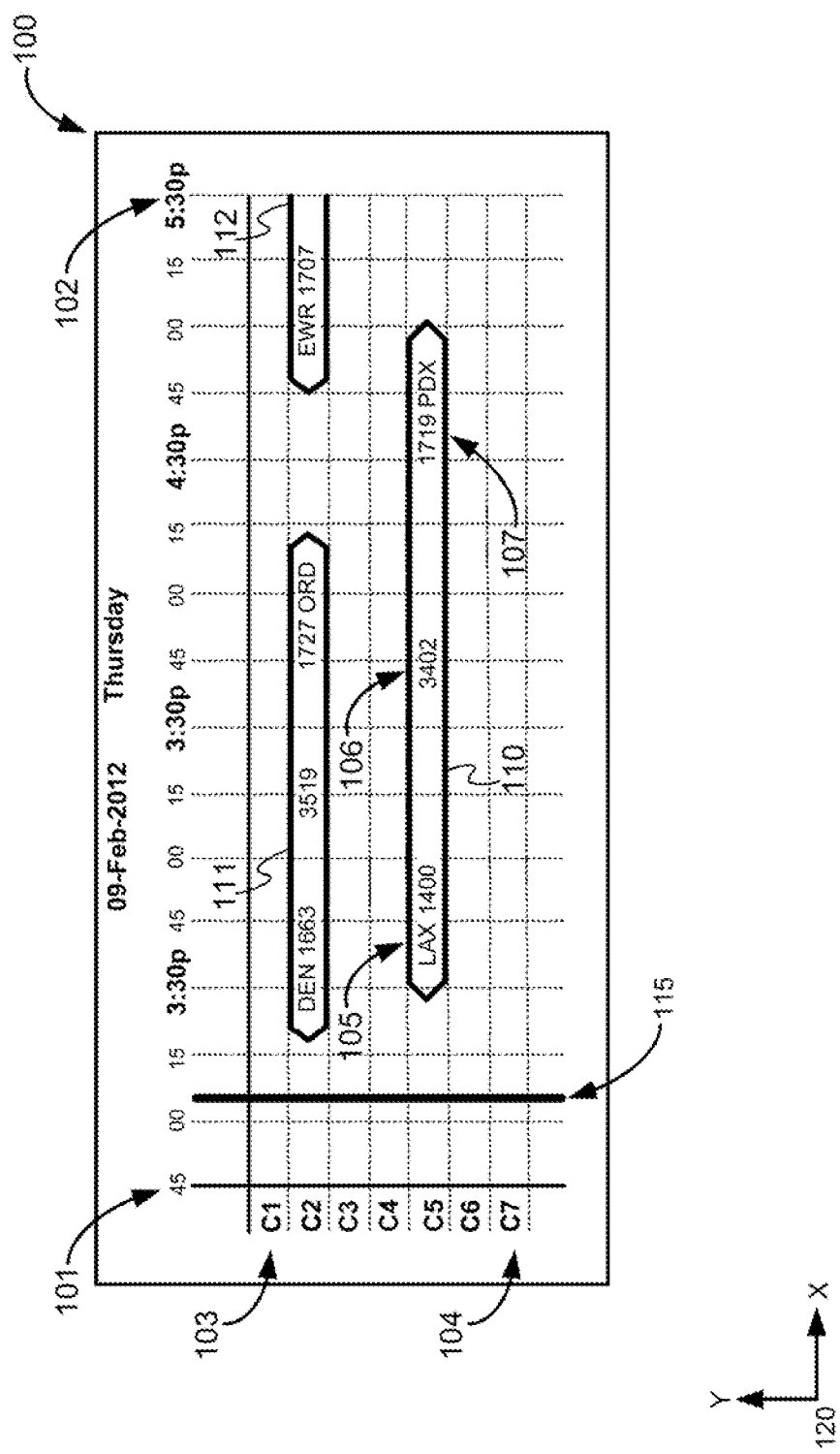
FIG. 1 shows an example main display, for an unspecified airport AP1, that is loosely based upon the "ARIS Gate Manager" product of Ascent Technology, Inc.

An example main display, for an unspecified airport "AP1," using an example gate-assignment App "GAA1," is shown in FIG. 1. The display of FIG. 1 is loosely based upon the "ARIS Gate Manager" product of Ascent Technology, Inc. (Cambridge, Mass.; U.S.A.). However, the display of FIG. 1 is merely for purposes of example, and the techniques of the present invention can be applied to any gate-assignment App with a Graphical User Interface (GUI). More generally, the techniques of the present invention can be applied to any App with a Graphical User Interface (GUI). The two main axes of FIG. 1 (such pair of axes labeled 120) serve the following functions:

Along the Y or "vertical" axis, each row of the gate-assignment chart represents an aircraft gate. For the example of FIG. 1, from top to bottom, gates labeled C1 (also labeled as 103) to C7 are shown (also labeled as 104).

The X or "horizontal" axis of the chart represents time. For the example of FIG. 1, from left to right, the time range shown is 2:45 pm (indicated as time 101) to 5:30 pm (indicated as time 102).

The gate-assignment chart of FIG. 1 presents a timeline, of how a particular gate is utilized by different airplanes during the day. Vertical line 115 (also called the "now line") indicates the current time at which the chart is being viewed. As can be seen, the current time is approximately 3:05 pm. A period of time during which an airplane remains at a gate is represented by a "lozenge" shape. The points at the left and right ends of a lozenge provide, respectively, an airplane's arrival and departure times at a gate. For example, FIG. 1 includes a lozenge 110, that indicates the following data:

an airplane at gate C5 location at middle of lozenge 110 (middle area labeled 106) has space for the airplane's registration number (in the case of lozenge 110, the registration number is "3402")

location at left end of lozenge 110 (labeled 105) has space for indication of an airplane's arrival flight leg (in the case of lozenge 110, the arrival flight leg is Flight No. 1400 from LAX)

airplane 3402 arrives at gate C5 (as Flight 1400 from LAX) at approximately 2:27 pm location at right end of lozenge 110 (labeled 107) has space for indication of an airplane's departure flight leg (in the case of lozenge 110, the departure flight leg is Flight No. 1719 to PDX)

airplane 3402 departs from gate C5 (as Flight 1719 to PDX) at approximately 5:00 pm The gate-assignment chart of FIG. 1 also includes lozenge shapes 111 and 112. Some of the data indicated, by each of these shapes, is as follows. Lozenge 111:

an airplane at gate C2 airplane's registration number is "3519"

airplane 3519 arrives at gate C2 as Flight No. 1663 from DEN airplane 3519 departs gate C2 as Flight No. 1727 to ORD airplane 3519 arrives at gate C2 at approximately 3:17 pm airplane 3519 departs gate C2 at approximately 4:13 pm Lozenge 112:

an airplane at gate C2 only left size of lozenge 112 is shown (rest of lozenge is assumed to "scroll" into view later)

airplane's registration number and departure flight leg are not shown airplane is expected to arrive at 4:45 pm as Flight No. 1707 from EWR Using a gate-assignment system like GAA1, a ground-control manager can assign airplanes to gates by creating and moving such lozenge shapes. The graphical nature of the display assists the manager in avoiding conflicts (i.e., two or more planes utilizing a same gate at a same time), since it is immediately obvious whether lozenges within a row overlap. Of course, in addition to avoiding overlap, many other types of rules may need programming into a gate-assignment system. For example, the lozenges can be required to provide sufficient transition time, between one plane's departure and another's arrival. In addition to the types of information discussed above, a lozenge shape typically also includes information about the type (e.g., manufacturer and model number) of an airplane since certain types of planes can only be accommodated at certain types of gates.

1.2 Additional Features Desired

Assume gate-assignment App GAA1 (that can be, as discussed above, any suitable gate-assignment software) has been supplied to airport AP1 by a software company "SC1" (that can be any suitable software supplier). Assume AP1 would like to add a collection of features (let's call the feature collection "FC1") to GAA1 and that FC1 is unique to the particular needs of this airport. For purposes of example, we will assume an FC1 that includes the following features:

Live Gate Camera: An ability to see, for each gate, a live (or real time) camera feed. Such camera could show, for example, the airplane (if any) currently at the gate and the jet-way equipment (if any) for boarding or unboarding a plane.

Flight Status: An ability to see, for each flight, its current status (e.g., current location, altitude, speed, and ETA).

Local Weather: provision of a weather forecast, in the vicinity of AP1.

For each of the above-listed features, it can be appreciated that a convenient user interface would follow a similar pattern:

the user clicks on an appropriate area of a gate-assignment chart; and a pop-up window displays the requested information.

While it can be expected that GAA1 will already use mouse clicks for such operations as selecting and dragging lozenge shapes, we will assume that such mouse clicks are never used in combination with the "Control-Shift" (or C-S) key combination. In this case, each feature of FC1 could be activated by a mouse click, when combined with the C-S key combination. This type of mouse click can also be referred to herein as "C-S+mouse-click." Example types of locations (or regions of a user's screen), for a C-S+mouse click on the gate-assignment chart of FIG. 1, along with the kind of data that might be desired in response, are as follows:

Live Gate Camera: If a live camera view is desired, for an unspecified gate G1, a ground-control manager can obtain such view by simply performing a C-S+mouse-click anywhere within the row of FIG. 1 representative of gate G1. For example, if the view near gate C7 is desired, in order to confirm that it is indeed empty, the ground-control manager need only perform a C-S+mouse-click anywhere in the row of the chart of FIG. 1 that represents gate C7. In response, a "pop-up" window can appear, showing the video for gate C7.

Flight Status: If current status is desired, for a particular flight leg, the ground-control manager can obtain such information simply by performing a C-S+mouse-click on either end of an applicable lozenge. For example, assume the current time is 3:05 pm at AP1 (e.g., "now line" 115 of FIG. 1), so that the airplane for gate C5, with registration number 3402, is currently in-route, to AP1, as Flight No. 1400 from LAX. The ground-control manager can perform a C-S+mouse-click, at left end 105 of lozenge 108. In response, a "pop-up" window can appear, showing current status data for Flight No. 1400.

Local Weather: If local weather is desired, it may be desirable to allow that a C-S+mouse-click anywhere on the chart of FIG. 1 be capable of providing a local weather display (since weather is a global condition with respect to all gates at AP1). Since the live gate camera and current status options have already been described as utilizing certain sub-regions of the screen, it is clear that addition of a local weather feature requires some kind of mechanism for disambiguating the feature of FC1 that is meant by a C-S+mouse-click. In such situations, one approach is to provide a pop-up menu of the available features, from which a ground-control manager can choose.

To further explain the feature-disambiguating pop-up menu, consider the following example. Suppose a C-S+ mouse-click occurs at left end 105 of lozenge shape 108. This mouse click could be meant to invoke any of the three above-listed features of FC1. In this situation, a pop-up menu can appear, giving the ground-control manager the option of obtaining one of the following three windows: live camera data, current flight status, or local weather.

Without the techniques of the present invention, it can be expected that AP1 would need to obtain, from SC1, customized changes to the source code of GAA1. In many situations, such customer-customized changes are not available, or, even if available, can be too costly for AP1.

2 First Embodiment

Source code changes to GAA1 are not needed if, in accordance with the teachings of the present invention, GAA1 is provided with a facility for extensibility.

Such extensibility enables the following approach:
1. The users of GAA1 are divided into two groups (in some situations, the same individual is a member of both groups):
   a. end-users: One or more actual end-users of GAA1 (e.g., a ground-control manager), and
   b. administrative users: One or more Information Technology (or "IT") administrators, responsible for keeping all software tools (including GAA1), and related IT infrastructure, accessible to the end-users group.
2. The administrative users provide new features to GAA1, in response to requests by the end-users, without the administrative users needing to obtain source code changes to GAA1 by SC1.

The main interface, by which administrative users provide the new features, can be a database where certain kinds of rules can be stored (also referred to herein as a "Rules Database"). Administrative users are provided with access to this Rules Database. By simply writing new rules (that follow a specified format) the administrative users are able to add new features.

In addition to access to a Rules Database, the administrative users need the following types of documentation from SC1:
1. Identification of the unique signal (e.g., use of the keyboard combination C-S when entering a mouse-click) by which an end-user indicates a desire to invoke a feature provided by the administrative users. More generally, we can use the following terminology:
    gesture: any unique signal, designated as indicating a desire to invoke a user-programmed feature, with respect to a user-indicated location of an application's screen. The gesture can be input with any suitable input device, such as the combination of keyboard keys described above.
    User-Pointed Location (UPL): the particular location, on an application's screen, identified by a user. Such UPL can be indicated by any suitable technique, by which a user indicates a location on an application's screen. Suitable techniques include, but are not limited to, the following: use of a mouse or use of one's finger with a touch-sensitive screen.
2. An explanation of each class of screen region (or screen-region class), into which the screen of GAA1 is divided. For the three features of FC1 discussed above, the three screen-region classes are:
    Live Gate Camera: each row of a gate-assignment chart.
    Flight Status: either end of a lozenge.
    Local Weather: the entire gate-assignment chart.
3. When a particular instance of a screen-region class is selected (i.e., the row of the chart of FIG. 1 that represents gate C7), an explanation of the types of data (or "parameters") that are available to a rule of the Rules Database.
4. An explanation of how to write rules for the Rules Database.

Figure 2A:
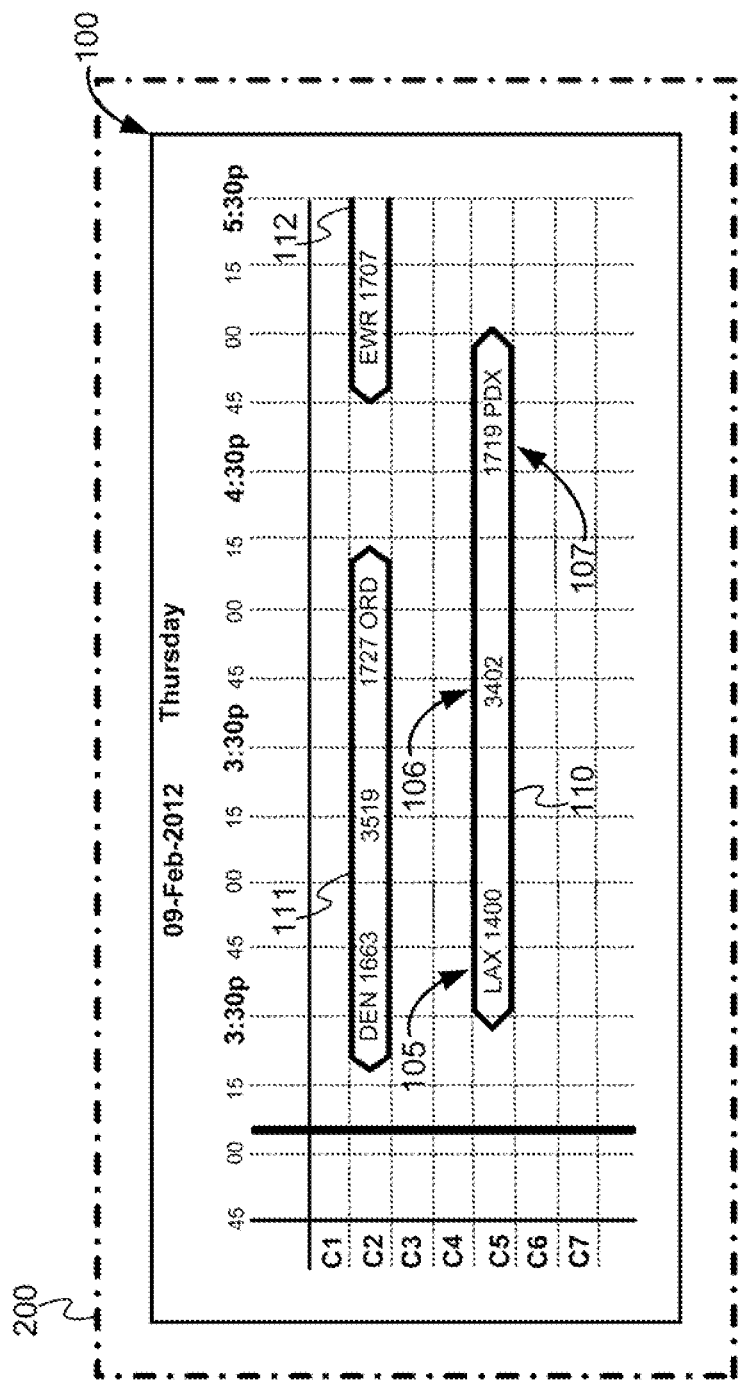
FIG. 2A depicts a screen-region class called "WHOLE_CHART."
Figure 2B:
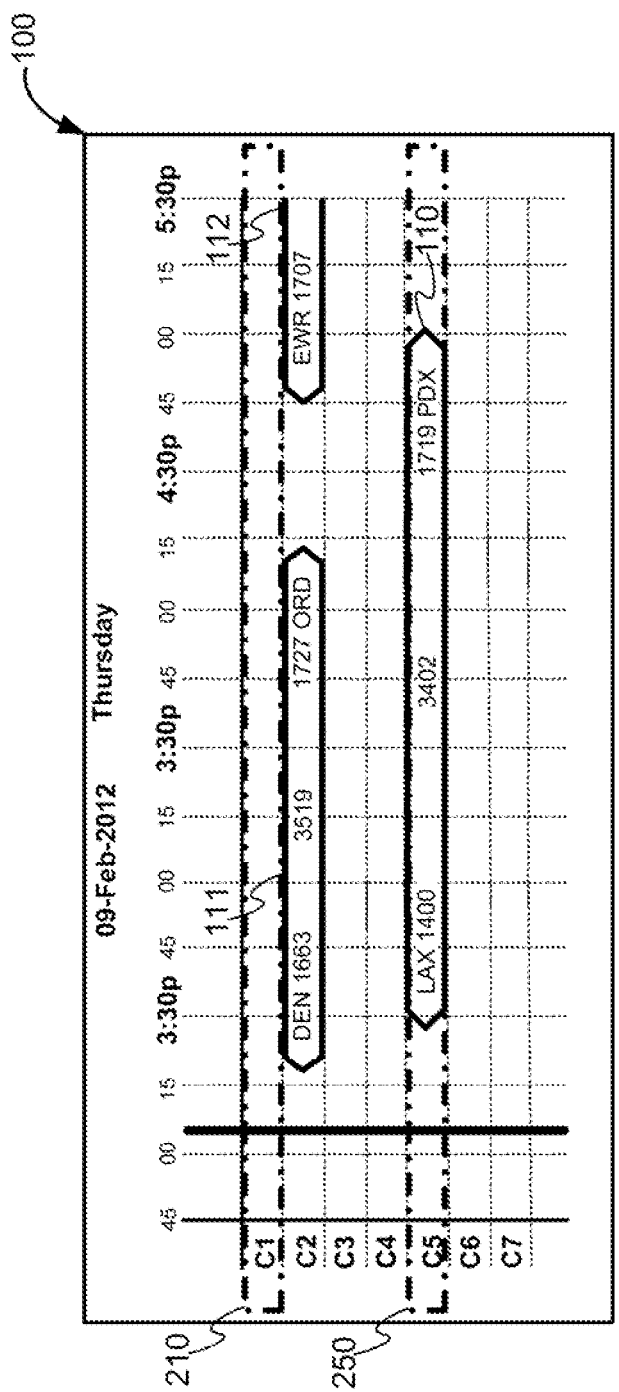
FIG. 2B shows a screen-region class called "GATE_ROW."
Figure 2C:
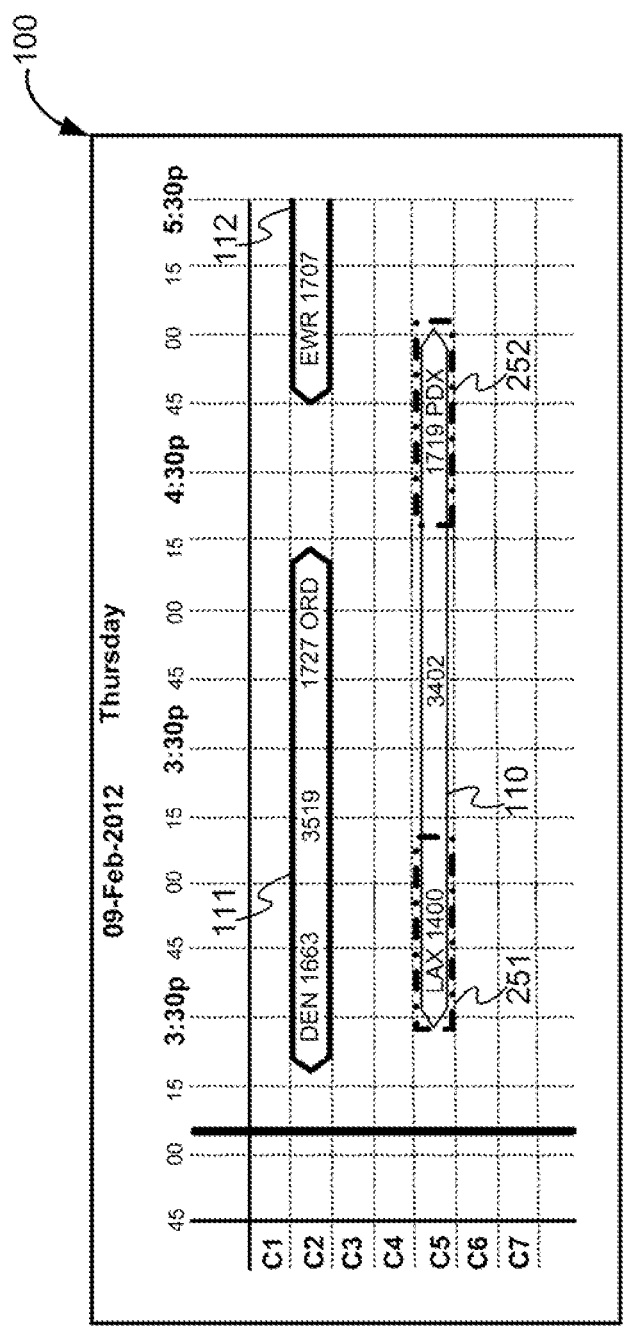
FIG. 2C shows a screen-region class called "FLIGHT_LEG."

For each feature of collection FC1, an example screen-region class is depicted in one of FIGS. 2A-2C. FIG. 2A depicts a screen-region class called "WHOLE_CHART," an example instance of which is indicated by outline 200. FIG. 2B shows a screen-region class called "GATE_ROW," example instances of which, for Gates C1 and C5, are indicated by, respectively, outlines 210 and 250. FIG. 2C shows a screen-region class called "FLIGHT_LEG," example instances of which, for lozenge shape 110, are indicated by, respectively, outlines 251 and 252 (to better emphasize the flight leg regions, lozenge shape 110 is shown in lighter outline). For purposes of example, it is assumed that each of these screen-region classes corresponds, as follows, to a feature of FC1:

TABLE 2.1

| Screen-Region Class | Feature |
|---|---|
| WHOLE_CHART | Local Weather |
| GATE_ROW | Live Gate Camera |
| FLIGHT_LEG | Flight Status |

For each instance, of an above-listed screen-region class of Table 2.1, the following Table 2.2 lists at least some of the parameters (available to a rule of the Rules Database):

PARAMETER TABLE 2.2

| Screen-Region Class | Parameter Name | Parameter Description |
|---|---|---|
| WHOLE_CHART | airport | name of airport where GAA1 being used |
| WHOLE_CHART | user | user name of current user of GAA1 |
| GATE_ROW | terminal | terminal name or number where selected gate is located |
| GATE_ROW | gate | name or number of gate selected |
| FLIGHT_LEG | airline | airline code of selected flight leg |
| FLIGHT_LEG | flight | flight number of selected flight leg |

Regarding documentation on the Rules Database, it can be described as having the following basic structure:
1. Each time a member of the end-users group performs a gesture and enters a UPL, such that at least one instance of one screen-region class is indicated, the Rules Database is probed for rules that may be triggered.
2. The condition, for a rule being triggered, is that any screen-region classes, required by the rule, are indicated by the gesture and UPL. The administrative users decide the screen-region classes that are required.

If more than one rule is triggered, the end-user can be provided with a rule-disambiguating pop-up menu by which to select the rule to execute.

Execution of a rule includes:
1. Generation of a URL "U1," in accordance with a rule's "template." Administrative users write the template, in order to provide a response most closely customized to the end-users' needs.
2. In addition to containing literal text for inclusion in U1, a template can include one or more parameters. When a template is executed, each parameter can be replaced with the text-equivalent of its value. The value of a parameter is determined by the particular instances indicated. For example, if gate C7 is subjected to the gesture and UPL, then C7 is the instance of GATE_ROW selected, and the value of the parameter "gate" can be "C7." As is discussed further, in below Section 3, the value of a parameter can be retrieved from an instance by utilizing a kind of function herein called a "resolver."
3. For each feature desired, the data requested by an end-user (e.g., a ground controller) can be accessed through the transmission of U1 to an appropriate data source.
4. GAA1 can execute U1 by opening a browser window and inputting U1. The end-user's requested data is then displayed in the browser window.

More specifically, an example Rules Database can be structured as follows.

First, there can be a table (shown below as Trigger Table 2.3) specifying the trigger condition for each rule:

TRIGGER TABLE 2.3

| Classes Required | Rule Name |
| --- | --- |
| WHOLE_CHART | Display_Local_Weather |
| GATE_ROW | Display_Live_Gate_Camera |
| FLIGHT_LEG | Display_Flight_Status |

For each row of Table 2.3, its left and right columns can specify, respectively, the following information:
  trigger condition: the screen-region classes that need to be indicated, by a gesture at a UPL, in order for a rule to be triggered; and
  rule name: the name of rule to perform, if the trigger condition is satisfied.

For example, the rule Display_Local_Weather is shown as triggered simply by a UPL within WHOLE_CHART. The above table shows only a single screen-region class per rule trigger. However, rule triggering can be made dependent upon a UPL that indicates multiple classes of screen-regions. This can be accomplished by having multiple rows entered with a same rule name, but each row specifying a different screen-region class. In this case, a logical AND operation is performed, where all the rows, for the single rule name, must be satisfied before the rule is triggered.

Figure 2D:
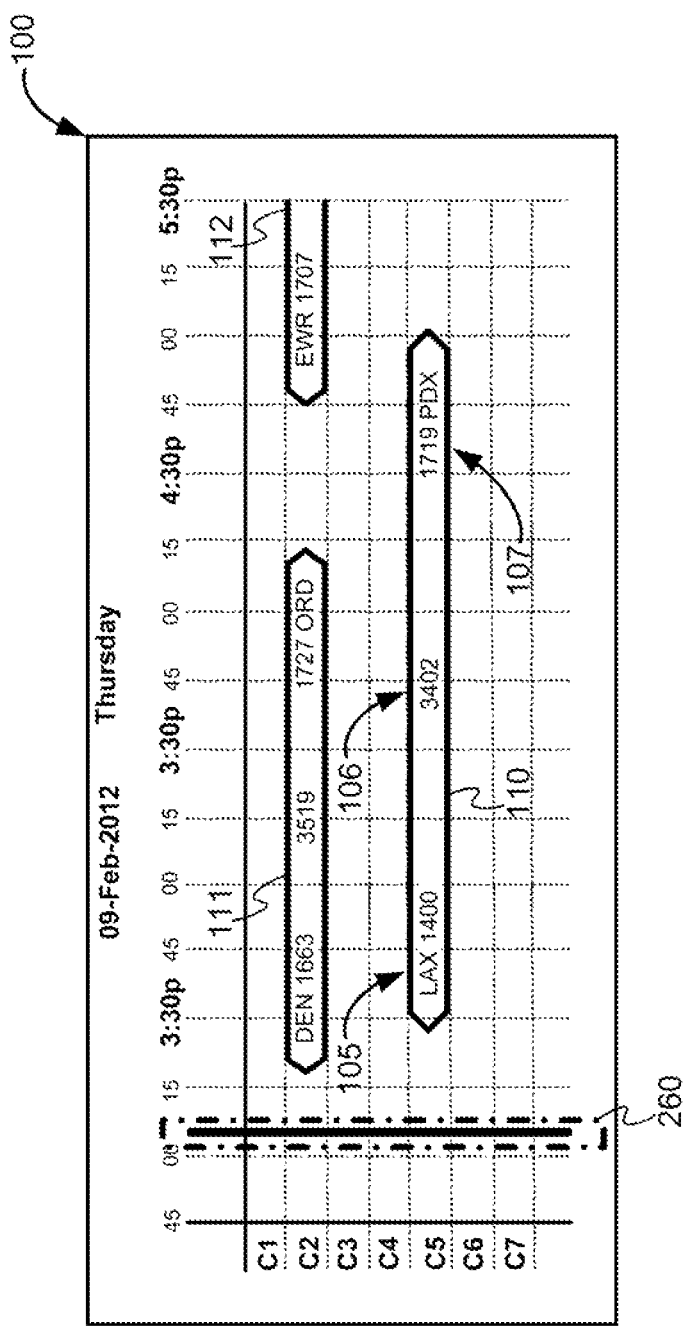
FIG. 2D depicts a screen-region class called "NOW_LINE."

For example, it might be desirable to further limit the "Live Gate Camera" feature, such that it is only activated if, in addition to selecting a gate row, the UPL is on (or near) the "now line" (e.g., "now line" 115 of FIG. 1). FIG. 2D depicts a screen-region class called "NOW_LINE," an example instance of which is indicated by outline 260. Trigger Table 2.3, as shown above, can be augmented to become the following Trigger Table 2.3.1:

TRIGGER TABLE 2.3.1

| Classes Required | Rule Name |
| --- | --- |
| WHOLE_CHART | Display_Local_Weather |
| GATE_ROW | Display_Live_Gate_Camera |
| NOW_LINE | Display_Live_Gate_Camera |
| FLIGHT_LEG | Display_Flight_Status |

As can be seen, Trigger Table 2.3.1 is the same as Trigger Table 2.3, except that the rule Display_Live_Gate_Camera now has two rows: one that requires the GATE_ROW class and another that requires the NOW_LINE class. (In the following discussion, however, it will be assumed that Display_Live_Gate_Camera needs only the class GATE_ROW for triggering.)

A second major aspect, to structure of the Rules Database, is that it can contain a table (shown below as Action Table 2.4) specifying the action for each rule:

ACTION TABLE 2.4

| Rule Name | Action Template |
| --- | --- |
| Display_Local_Weather | http://intra.AP1.com/weather? |
| Display_Live_Gate_Camera | http://intra.AP1.com/rampview?gate=${gate} |
| Display_Flight_Status | http://flightaware.com/live/flight/${airline}${flight} |

Each row of Table 2.4 specifies, in its left and right columns, respectively, the following information:
  rule name: the name of rule to perform; and
  action template: a character string that specifies the formation of a URL To show how a template can work, consider the example discussed above, of an end-user gesture with a UPL anywhere over gate C7, as depicted in the gate-assignment chart of FIG. 1:
1. The UPL indicates (at least) an instance of the screen-region class GATE_ROW.
2. Trigger Table 2.3 is probed to determine that (at least) action Display_Live_Gate_Camera is triggered.
3. Action Table 2.4 is probed to determine that (at least) the following template is to be executed:
   http://intra.AP1.com/rampview?gate=${gate}
4. The following portion of the template specifies that, in the URL produced, its parameter "gate" is to be substituted by its text-equivalent value in the instance for gate C7:
   ${gate}
5. If we assume the text-equivalent value for "gate" is "C7," then the following URL is produced:
   http://intra.AP1.com/rampview?gate=C7

As discussed above, however, a gesture and UPL anywhere over a gate's row not only means that an instance of screen-region class GATE_ROW is indicated, but that (at least) the screen-region class WHOLE_CHART is also indicated. In this case, as discussed above, a feature-disambiguating pop-up menu can be displayed. The production of useful descriptions for the user in such pop-up menu can, in a way similar to the production of URL's, also be accomplished by templates. Following is a table of such description-producing templates:

DESCRIPTION TABLE 2.5

| Rule Name | Description Template |
| --- | --- |
| Display_Local_Weather | View weather for AP1 |
| Display_Live_Gate_Camera | View camera for gate ${gate} |
| Display_Flight_Status | View data for flight ${flight} |

Assume a user enters a gesture and UPL over the left side (i.e., side 105) of lozenge shape 110, as shown in FIG. 1. In accordance with the screen-region classes of FIGS. 2A-2C, it can be appreciated that the following instances and classes are indicated:
  1. instance for AP1 from the class WHOLE_CHART,
  2. instance for C5 from the class GATE_ROW, and
  3. instance for LAX 1400 from the class FLIGHT_LEG.

Referring to Trigger Table 2.3, it can be seen that these three classes will trigger all three rules. In order to allow the end-user to decide which rule to execute, a pop-up menu can be produced with descriptions produced according to Description Table 2.5. Of course, it is also possible to simply have all (or any appropriate subset) of the triggered rules executed, without presenting a disambiguating pop-menu to the end-user.

Assuming a disambiguating pop-menu is desired, each template of Table 2.5 can, respectively, operate as follows:
  Since the template consists of only the literal string "View weather for AP1" this literal string labels a choice in the pop-up menu.
  The template has the parameter "${gate}." Since the UPL indicates the row for gate C5, the parameter "${gate}" is "resolved" to "C5." The literal string labeling a choice in the pop-up menu is: "View camera for gate C5"
  The template has the parameter "${flight}." Since the UPL indicates flight 1400, the parameter "${flight}" is resolved to "1400." The literal string labeling a choice in the pop-up menu is: "View data for flight 1400"

Whenever a template's parameter is being resolved, regardless of whether the parameter is appearing in an Action or Description Template, each indicated screen-region instance is checked for whether it has a value for the parameter. For the example given above, where a user has entered a gesture and UPL over side 105 of lozenge shape 110, the three above-listed instances are checked (i.e., instance for each of AP1, C7, and LAX 1400). Each instance can be checked by use of a resolver function (mentioned above), where each screen-region class has its own resolver.

If the choice to "View data for flight 1400" is selected, then the Action Template, of Action Table 2.4, can produce the following URL:
  http://flightaware.com/live/flight/AscentAir1400
Where the parameter "${airline}" is resolved to "AscentAir" (a fictional airline) and parameter "${flight}" is resolved to "1400." FIG. 5 shows an example screen 500, that can be produced in response to the URL. As can be seen, screen 500 has two panes:

1. Left pane 501: displays various data about Flight 1400.
2. Right pane 502: displays a map of the continental U.S., with:
   a. Dot 510 labeling the departure airport of LAX
   b. Dot 511 labeling the arrival airport of BOS, and
   c. Arrow 512 showing the portion of the flight path currently completed by Flight 1400 (as of 3:05 pm Eastern Time, as indicated by "now line" 115 of FIG. 1).

Any suitable relative positioning can be used, between screen 500 of FIG. 5 and screen 100 of FIG. 1. For example, if the display screen is large enough, screen 500 can be displayed without any overlap of screen 100. Alternatively, screen 500 could overlap any or all of screen 100. Once the end-user has obtained sufficient information from screen 100, it can be "closed," as can be accomplished with any windowed display system.

While this section has focused upon gate-assignment software, it should be readily appreciated that the technique described herein, for producing user-extensible software, can be applied to any kind of application software. It is only required that the application use a graphical user interface (GUI) where the screen can be meaningfully divided into different classes of screen-region.

While this section has focused on the generation of a URL, more generally, any URI could be produced. In addition to generating a URI, templates could instead (or also) be used to produce any other type of command or request. For example, a template could be used to generate a database query, such as an SQL query.

While this section has focused on the generation of a URI encoded as a character string, any kind of encoding, suitable for the particular area of use of the application, can be produced.

Further, any kind of URI can be produced, including URI's that include one or more embedded database queries or one or more embedded commands.

3 Implementation Strategies

To continue with the example of above, GAA1 can either be designed by SC1 with the extensibility capability of a user-accessible Rules Database or, if it is already a commercially available App, it can be retrofitted to provide this capability. Either way, this section outlines some example coding strategies for efficient implementation of such extensibility. To emphasize the general applicability of the invention to any GUI-oriented App, the following discussion shall refer to an "App1" rather than to GAA1.

We shall refer to the portion of App1's code, responsible for responding to an end-user's input of a UPL, the "UPL Processor." The UPL Processor needs to incorporate a test to determine whether the UPL is accompanied by a gesture and is therefore an invocation of a user-added command. If the input of a UPL does include a gesture, the UPL Processor needs to invoke that portion of App1's code responsible for execution of user-defined commands. We can refer to such portion of App1's code as the "Gesture Processor."

FIGS. 3A-3D depict an example pseudo-coded implementation of a Gesture Processor. The main procedure for the Gesture Processor (called "GestureProcessor") is shown in FIG. 3A at lines 9-22. GestureProcessor operates in three main stages:
  1. The information needed, for execution of the applicable user-created feature, is collected. The information collected is stored in an instance of a data type called "token" (see FIG. 3A, lines 2-7, for an example definition of the token data type). In more detail, this stage can be described as follows:
a. The collection of information is performed by "CollectAccess4Instances" (called at line 13).
b. The information, collected by CollectAccess4Instances, is stored in an instance of the token data type called "Info4UserCommands." CollectAccess4Instances creates the token instance, while line 13 assigns it to Info4UserCommands.
c. As can be seen, the token data type is designed to hold at least two main types of information, regarding an end-user's latest UPL:
  i. HandledTypes: holds the class name, for each instance indicated by the UPL;
  ii. ParameterResolvers: for each class of instance, indicated by the UPL, a type of function called a "resolver" is stored. In general, a resolver takes at least the following two types of inputs: instance to be accessed and name of parameter to be accessed within the instance. A resolver works as follows. If the input parameter name is the name of a field of the input instance, the resolver will fetch its value. As stored on ParameterResolvers, each resolver can already be bound to the instance to which it can be applied. If so bound, for purposes of further access, only a parameter name need be applied to the resolver.
2. Any rules of the Rules Database, that can be triggered by the latest UPL, are determined. This is shown as accomplished by the "FindMatchingRules" procedure of line 16. The rules identified are assigned to MatchingRules (also line 16). Regarding the token Info4UserCommands, FindMatchingRules only needs to access "HandledTypes."
3. The number of rules that can be triggered is tested. If only one rule is triggered (line 18), then that rule can be executed (by calling "InvokeRule"). If more than one rule is triggered (line 20), then a disambiguating pop-up menu can be produced (by calling "DisambiguatingPopupMenu"). Once the user has selected the desired action, the requested rule is executed.

While any suitable programming language can be used, to implement App1 and its Gesture Processor, there can be advantages to utilizing an object-oriented programming language:
1. The language itself can provide facilities for the definition of classes of screen region and their instantiation.
2. Upon the definition of a class of screen region, its resolver, for accessing the parameters of subsequently created instances, can be automatically provided.
3. Treatment of each resolver as being a kind of object, where the applicable ones can be collected as described above for a token's ParameterResolvers field, is facilitated when all classes are made subordinate to a single generic class.
4. Depending upon the application, it can be useful to define the screen-region classes according to a class hierarchy. In general, if an application needs to model similar but non-identical types of screen regions, a root screen-region class can be created to handle the shared parameters, while a screen-region sub-class can be created for the parameters unique to each screen region type. If further partial sharing is found, within the parameters allocated to a sub-class, such sub-class can, in a recursive fashion, serve as a "root" class for further sub-sub-classes. An example, in the area of airport gate assignment, is if an airport has different types of gates, that can be modeled with similar but non-identical parameter sets. Each type of gate can be coded as its own screen-region sub-class, that handles the parameters unique to the type of gate it models. Each such screen-region sub-class inherits, from a root screen-region class, the parameters that all gate types share.

Pseudo-code, for CollectAccess4Instances, is shown in FIG. 3B. CollectAccess4Instances operates in three main stages:
1. An initially empty token, for holding the results of CollectAccess4Instances, is created and assigned to "Info4UserCommands" (line 4).
2. Each instance indicated, by the end-user's latest UPL, is iterated over (see "FOR EACH" loop beginning at line 10):
  a. The current instance of an iteration is indicated by "DisplayedInstance" (line 10).
  b. The class, to which Displayed Instance belongs, is determined (by "ClassOf" at line 12) and added to the "HandledTypes" of Info4UserCommands.
  c. The resolver, by which values of the parameters of an instance can be retrieved, is found (by "ParameterResolver" line 15). The resolver is added to the collection of all potentially applicable resolvers for the UPL.
3. The information collected is returned (line 17).

Pseudo-code, for FindMatchingRules (second major stage of GestureProcessor), is shown in FIG. 3C (lines 8-18). FindMatchingRules operates in three main stages:
1. A variable (called "Results"), to hold the results of FindMatchingRules, is created (line 10).
2. Each rule, in the Rules Database (called "RuleSet"), is iterated over (see "FOR EACH" loop that begins at line 12):
  a. The current rule of an iteration is indicated by "Rule" (line 12).
  b. If "Rule" is triggered by the classes of the instances indicated by the latest UPL (determined by "RuleMatchesToken" of line 13) "Rule" is added to the "Results" of FindMatchingRules (line 14).
3. The triggered rules are returned (line 17).

RuleMatchesToken is also shown in FIG. 3C (lines 21-23). It operates as follows. It uses "RequiredTypes" types to retrieve the classes required by a rule's Trigger Table (line 22). As long as each of these classes is listed in the "HandledTypes" of the current token (determined by the "SUBSET" function of line 22), a value of TRUE is returned.

Pseudo-code, for InvokeRule (third major stage of GestureProcessor), is shown in FIG. 3D (lines 2-8). It operates as follows (all of the following is performed by the nested function calls of line 7):
1. The template for the current rule "Rule" is retrieved (by the procedure "URLTemplate").
2. The retrieved template is resolved (by procedure "ResolveTemplate").
3. The resolved template (a complete URL) is submitted to a web browser (by procedure "DisplayWebBrowser").

Pseudo-code, for ResolveTemplate, is shown in FIG. 3D (lines 10-24). It operates as follows:
1. The URL to be produced (represented by the variable "Result") is initially set to the empty string (line 11).
2. The current template for processing, indicated by "Template," is parsed into "Segments" (see "FOR EACH" loop that begins at line 15).

3. Each "Segment" is tested (by line 16) as follows:
   a. If it can become a literal part of the URL to be produced (line 16), Segment is concatenated onto Result.
   b. If it is a parameter name that needs to be resolved into the text-equivalent of its current value (line 19), the parameter name is resolved by calling "ResolveParameter" (line 20). The resolver's result is concatenated onto Result.
4. The URL produced is returned as the value of ResolveTemplate (line 23).

Pseudo-code, for ResolveParameter, is shown in FIG. 3E (lines 5-15). It operates as follows:
1. Each available resolver is iterated over (see "FOR EACH" loop that begins at line 6).
2. Using the function "LookupParameter" (line 10), the current resolver (indicated by "ParameterResolver") is queried for whether it can find the value of the current parameter to be found (indicated by "Parameter").
3. If the current resolver is able to find a value for Parameter (i.e., line 11 finds the "Value" returned by LookupParameter to be a string, rather than NULL), the "Value" of the "Parameter" is returned (by line 12).

4 Computing Environment

FIG. 4A depicts an example "cloud" computing environment 400 in which the techniques described herein can be applied. Cloud computing refers to the delivery of computing as a service, over a network, and to a variety of clients. In FIG. 4A, the clients are labeled "Cloud Client 1" to "Cloud Client N." While any suitable computer system can be used for a cloud client, some examples include the following: a web browser, a mobile App, a thin client, or a terminal emulator. The delivery network is typically the Internet. The fact that Internet connectivity is often represented by the "cloud" symbol (e.g., Cloud 401 of FIG. 4A) has led to the name of the approach.

As shown in FIG. 4A, the computing delivered is typically at any or all of the following levels (from lowest level to highest):
  IaaS (Infrastructure as a Service) 410: A cloud provider offers computers (physical or virtual) from large pools of computers at one or more data centers. The number of computers made available can scale dynamically with a user's needs.
  PaaS (Platform as a Service) 411: In addition to providing IaaS, a cloud provider offers at least some of the basic software under which application execution and/or development occurs. Such basic software can include an operating system, support for a programming language, a database and/or a web server.
  SaaS (Software as a Service) 412: In addition to providing IaaS and PaaS, a cloud provider installs and operates particular application software. Examples of application software, in addition to GAA1 discussed herein, include the following: Customer Resource Management, communications tools of various kinds (such as email), virtual desktops, and games.

Figure 4B:
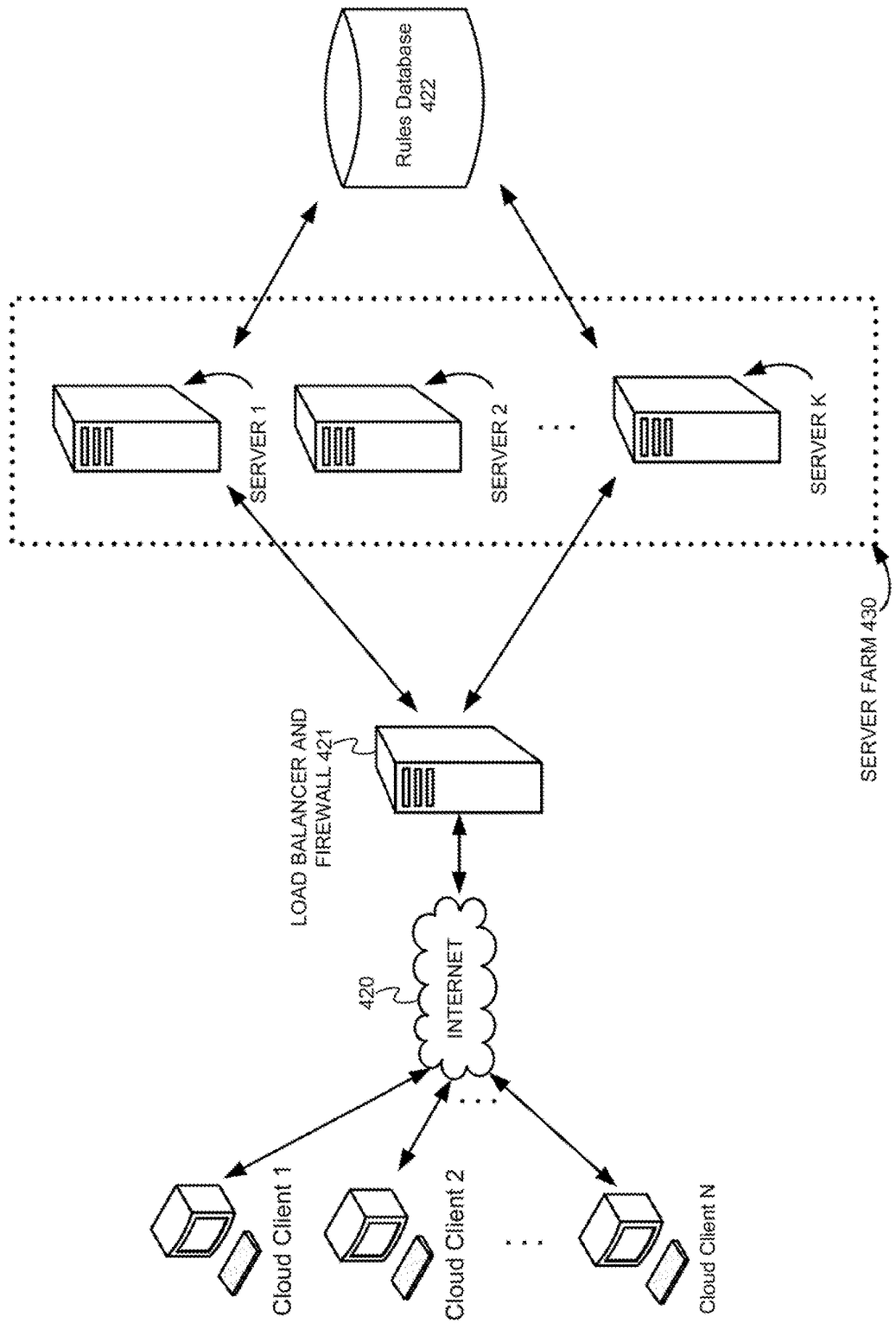
FIG. 4B is a more hardware-oriented version of FIG. 4A.

A more hardware-oriented version of FIG. 4A is shown in FIG. 4B. As with FIG. 4A, the clients are labeled "Cloud Client 1" to "Cloud Client N." The clients are shown as communicating with the cloud service provider through an Internet "cloud" 420. The front end hardware of the cloud service provider is shown as being a computer 421 that can provide, among other functions, load balancing and a firewall. Front end computer 421 is shown as connected to the servers of a Server Farm 430. The load balancing function, of computer 421, can balance the loading of these server farm servers. As can be seen, the server farm servers are labeled "Server 1" to "Server K." With regard to the present invention, the server farm servers can all share a Rules Database 422. As discussed above, Rules Database 222 is written by the administrative users, to implement additional features for the end-users.

The present invention can be incorporated into an application offered under a SaaS model. In this case, the invention can be viewed from at least the following perspectives:
  Client: The invention can be viewed from the perspective of a user, either an end-user or administrative user:
    a. End-user:
      i. The end-user uses her or his client to point to a location on the screen of an application program.
      ii. The end-user uses her or his client to enter a gesture.
      iii. In response, the end-user has displayed, on her or his client, a pop-up menu of features that can be selected or all applicable features are executed.
      iv. Regardless of how a feature or features are selected for execution, the end-user sees the result of such features on her or his screen.
    b. Administrative user:
      i. The administrative user uses her or his client to input a rule into the Rules Database.
      ii. The administrative user uses her or his client to specify, for each rule, a trigger that depends upon, at least, the classes of screen region indicated by an end-user of the application program.
      iii. The administrative user uses her or his client to specify, for each rule, a template that produces, upon occurrence of the trigger, a universal resource identifier.
      iv. The administrative user uses her or his client to specify, for each rule, a template that produces, upon occurrence of the trigger, a menu description.
  Server: The invention can be viewed from the perspective of the cloud service provider:
    a. The server receives, from an end-user, an indication of a location on the screen of an application program.
    b. The server receives, from an end-user, a gesture that the location indicates one or more instances of screen-region classes.
    c. The server may produce, in response to the gesture, a menu of features that the end-user can select for execution.
    d. Regardless of how a feature or features are selected for execution, the server can produce, for viewing by the end-user, the result of such features on her or his screen.

Of course, any suitable information technology infrastructure can be utilized. For example, it is still common for application programs to operate on a single-user personal computer. In this case, the functions of "client" computer and "server" computer are realized in the same physical computer at which a user is seated.

Figure 4C:
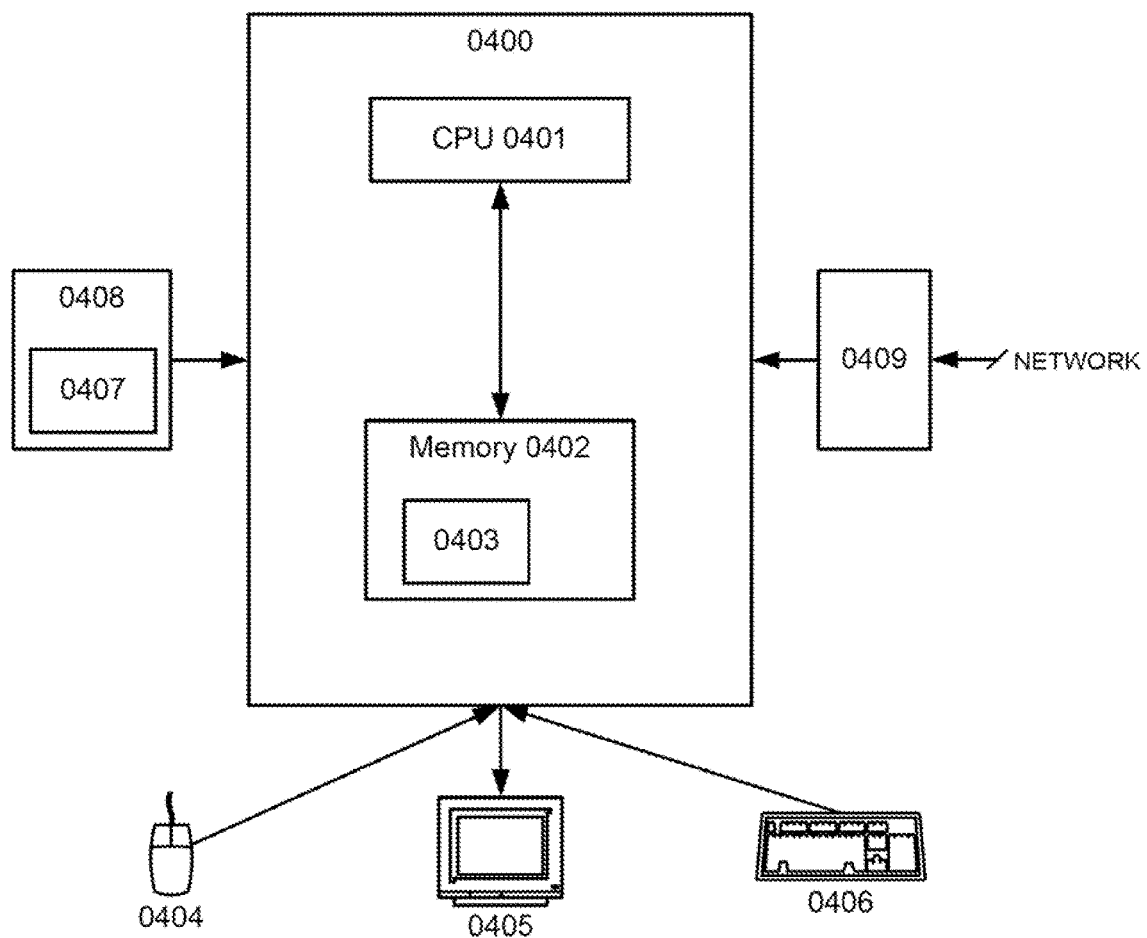
FIG. 4C depicts an example general purpose computer for use as a client, server, or both.

Whether the physical computer being used by a user is the entirety of the information technology infrastructure utilized, or whether such physical computer is simply a client to a server (where the server can be provided in a "cloud" fashion or in any other suitable way), FIG. 4C depicts an example general purpose computer for such purpose.

FIG. 4C depicts a single-user computer 0400 comprising a Central Processing Unit (CPU) 0401 (or other appropriate processor or processors) and a memory 0402. Memory 0402 has a region 0403 in which is stored the relevant software (such as a client for communicating with a cloud data center or the entire application itself) and its data. While 0403 is depicted as a single region, those of ordinary skill in the art will appreciate that, in fact, such software may be distributed over several memory regions or several computers. Furthermore, depending upon the computer's memory organization (such as virtual memory), memory 0402 may comprise several types of memory (including cache, random access memory, hard disk and networked file server). Computer 0400 can be equipped with a display monitor 0405, a mouse pointing device 0404 and a keyboard 0406 to provide interactivity between the software and the user. Computer 0400 also includes a way of reading computer readable instructions from a computer readable medium 0407, via a medium reader 0408, into the memory 0402. Computer 0400 also includes a way of exchanging data (and/or reading computer readable instructions via the Internet or other network) through network interface 0409.

In some embodiments, computer programs embodying the present invention are stored in a computer readable medium, e.g. CD-ROM or DVD. In other embodiments, the data and/or computer programs are embodied in an electromagnetic carrier wave. For example, the electromagnetic carrier wave may include the data or programs being accessed over a network.

If display monitor 0405, mouse pointing device 0404, and keyboard 0406 are omitted, FIG. 4C can also be representative of an embedded computer system.

5 Glossary of Selected Terms

Application Program: Any program intended to have a particular area of use or applicability. Generally has at least some provision for interaction with one or more users. Application programs are often distinguished against programs like an "operating system" (by which the operation of an application program is controlled) or other tools involved in the execution of an application program (such as a compiler or interpreter).

DEN: IATA code for Denver International Airport, Denver, Colo., U.S.A.

EWR: IATA code for Newark Liberty International Airport, Newark, N.J., U.S.A.

LAX: IATA code for Los Angeles International Airport, Los Angeles, Calif., U.S.A.

ORD: IATA code for Chicago O'Hare International Airport, Chicago, Ill., U.S.A.

PDX: IATA code for Portland International Airport, Portland, Oreg., U.S.A.

pseudo-code: The pseudo-code shown herein is based loosely on the "C" programming language.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for processing user-added features of an application program, comprising:

displaying, to an end-user, performed at least in part with a configuration of computing hardware and programmable memory, a first chart on a first screen of an application program, wherein the first chart includes a first axis representing time and, along a second axis, instances of a row class of screen region;

receiving pointing instruction, from an end-user, performed at least in part with a configuration of computing hardware and programmable memory, to a first location on the first screen;

receiving an indication, by the end-user, performed at least in part with a configuration of computing hardware and programmable memory, to at least a first instance of the row class of screen region, by detecting end-user input, constituting a gesture at the first location, while the first location is within a first screen region corresponding to the first instance of the row class of screen region;

responding, performed at least in part with a configuration of computing hardware and programmable memory, to the indication with the gesture to the first instance of the row class of screen region, by using a first template to produce a first universal resource identifier;

substituting in the first template, performed at least in part with a configuration of computing hardware and programmable memory, a first parameter of the indicated row class of screen region with a first value of the indicated instance of the row class of screen region;

producing, performed at least in part with a configuration of computing hardware and programmable memory, a first result of a first user-added feature using the first universal resource identifier based on the substitution; and transmitting, performed at least in part with a configuration of computing hardware and programmable memory, the first result for display to the end-user.

2. The method of claim 1, further comprising the following steps:

retrieving the first value, performed at least in part with a configuration of computing hardware and programmable memory, by applying the first resolver function to the first parameter and the first instance.

3. The method of claim 1, further comprising the following step:

receiving an indication by the end-user, performed at least in part with a configuration of computing hardware and programmable memory, of a second instance of a second class of screen region, as a result of the end-user inputting, while the first location is also within a second screen region, the gesture, wherein the second screen region is different from the first screen region.

4. The method of claim 3, further comprising the following steps:

transmitting to the end-user, performed at least in part with a configuration of computing hardware and programmable memory, the first result, wherein the first result was produced in response to the indication of, at least, the first instance and the second instance.

5. The method of claim 3, further comprising the following step:

producing for viewing by the end-user, performed at least in part with a configuration of computing hardware and programmable memory, a selection of actions to be taken, wherein a first member of the selection is produced according to, at least, a value from the first instance and a second member of the selection is produced according to, at least, a different value from the second instance.

6. The method of claim 5, further comprising the following step:
   receiving a selection from the end-user, performed at least in part with a configuration of computing hardware and programmable memory, such that the first instance, and not the second instance, is indicated for a subsequent production of the first universal resource identifier.

7. The method of claim 1, wherein each instance of the row class is represented by a region of the first screen that is utilized for representation of a gate.

8. The method of claim 1, wherein the first universal resource identifier is a universal resource locator.

9. The method of claim 1, further comprising:
   receiving, from a first administrative user who is not an end-user, performed at least in part with a configuration of computing hardware and programmable memory, a first rule for adding at least one feature to the application program, the first rule including at least a first trigger and the first template.

10. The method of claim 9, wherein the first trigger depends on, at least, the class of the first instance.

11. The method of claim 1, wherein the first universal resource identifier includes a database query.

12. The method of claim 11, wherein the database query is in SQL.

13. The method of claim 1, wherein the production of the first universal resource identifier is accomplished by utilization of a first rule that includes a first trigger and a first action.

* * * * *